(12) United States Patent
Lang et al.

(10) Patent No.: US 6,497,106 B2
(45) Date of Patent: Dec. 24, 2002

(54) METHOD AND APPARATUS FOR CHILLING A FOOD PRODUCT

(75) Inventors: Gary D. Lang, Naperville, IL (US); Robert J. Chamberlain, Oak Forest, IL (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/761,150

(22) Filed: Jan. 17, 2001

(65) Prior Publication Data
US 2002/0162349 A1 Nov. 7, 2002

(51) Int. Cl.⁷ .............................................. F25D 13/06
(52) U.S. Cl. ............................. 62/63; 62/346; 62/374; 62/381; 426/524
(58) Field of Search ........................ 62/63, 345, 346, 62/374, 380, 381; 426/524

(56) References Cited

U.S. PATENT DOCUMENTS

| | | | |
|---|---|---|---|
| 3,892,104 A | 7/1975 | Klee et al. ................... 62/186 |
| 4,033,142 A | 7/1977 | Schorsch et al. ............. 62/381 |
| 4,086,783 A | 5/1978 | Wagner et al. ............... 62/374 |
| 4,142,376 A | 3/1979 | Sandberg ...................... 62/158 |
| 4,276,753 A | 7/1981 | Sandberg et al. ............. 62/186 |
| 4,561,453 A | 12/1985 | Rothchild .................... 131/304 |
| 4,627,244 A | 12/1986 | Willhoft ........................ 62/63 |
| 4,745,762 A | 5/1988 | Taylor ............................ 62/63 |
| 4,800,728 A | 1/1989 | Klee ............................... 62/63 |
| 4,947,654 A | 8/1990 | Sink et al. ..................... 62/186 |
| 4,966,003 A | 10/1990 | Shima ............................ 62/63 |
| 5,220,812 A | 6/1993 | Palbiski et al. ............... 62/381 |
| 5,514,030 A | 5/1996 | Suhner ......................... 452/141 |
| 5,603,567 A | 2/1997 | Peacock ...................... 336/139 |
| 5,728,417 A | 3/1998 | Horn et al. .................. 426/231 |
| 5,787,716 A * | 8/1998 | Allen, Jr. ...................... 62/381 |
| 5,916,020 A | 6/1999 | Bocknek et al. .............. 452/49 |
| 6,007,859 A | 12/1999 | Taylor et al. ................ 426/302 |

FOREIGN PATENT DOCUMENTS

| | | |
|---|---|---|
| GB | 1278602 | 6/1972 |
| WO | WO8908982 | 10/1989 |
| WO | WO9839606 | 9/1998 |

OTHER PUBLICATIONS

"Autoweigh Feeder Series 600", Milltronics Co. (2000).
"Auto Weigh 600 SD Weigh Belt Feeder", Milltronics Co. (2000).
"Sensational New Scanvaegt Belt Weigher ScanFlow 4674", Scanvaegt International A/S (2000).

* cited by examiner

Primary Examiner—Ronald Capossela
(74) Attorney, Agent, or Firm—Donald T. Black

(57) ABSTRACT

Disclosed are a method and apparatus for chilling food product, employing (A) cooling means comprising (1) a rotatable drum, (2) means in said drum for urging pieces through said drum, (3) cryogen dispensing means, and (4) means for rotating said drum;

(B) feeding means which includes means for automatically sensing the mass flow rate at which said pieces are being fed into said inlet and for generating electrical signals corresponding to said rate;

(C) electronic control means responsive to said signals and temperature inputs for preventing premature flow of cryogen and for automatically controlling the rate at which cryogen is fed so as to lower the temperature of said pieces to the desired exit temperature.

16 Claims, 1 Drawing Sheet

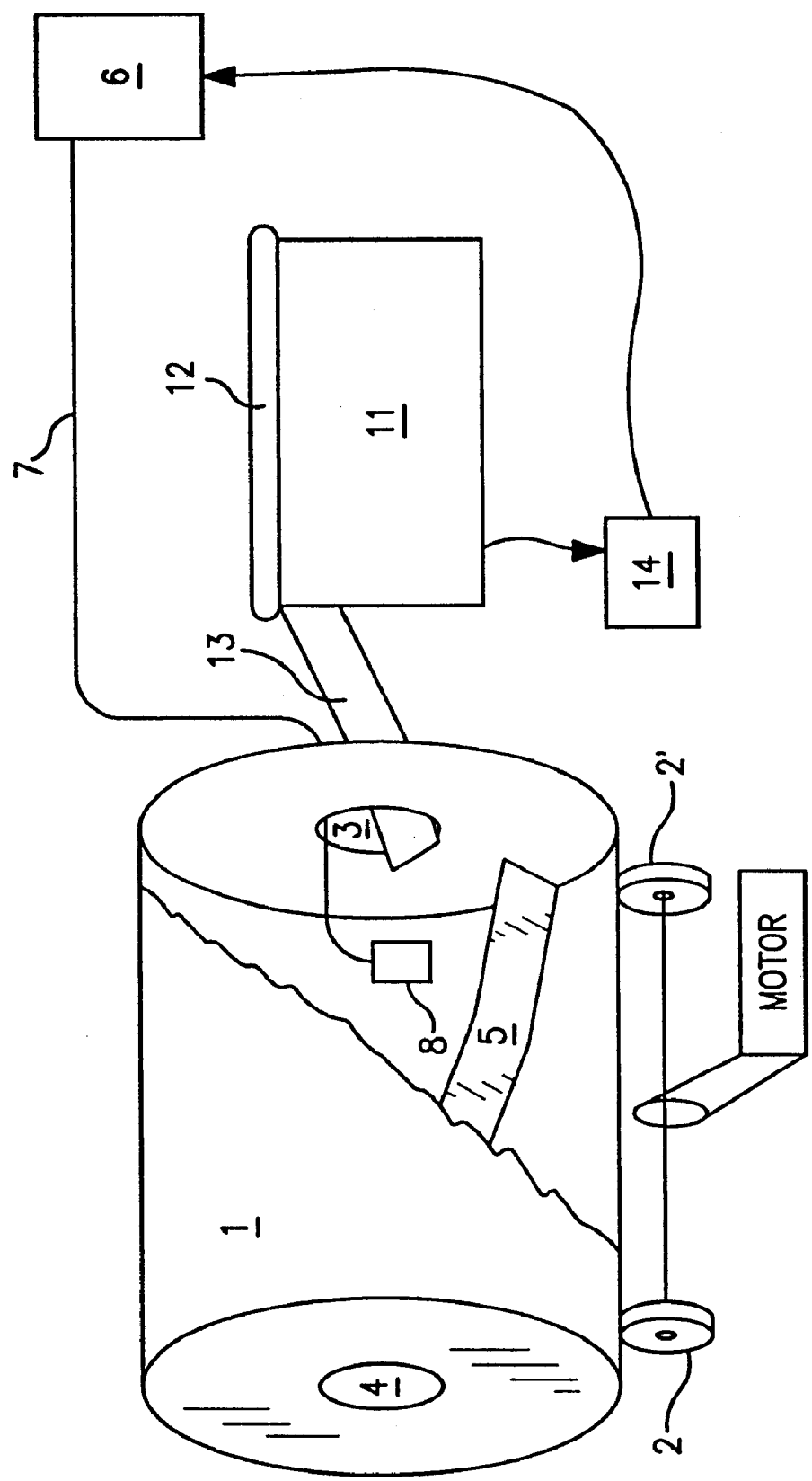

METHOD AND APPARATUS FOR CHILLING A FOOD PRODUCT

FIELD OF THE INVENTION

The present invention relates to a method and apparatus for reducing the temperature of a food product, and more particularly when the food product is in the form of a plurality of pieces of the product.

BACKGROUND OF THE INVENTION

In the food processing industry, it is often desirable that the pieces of food being processed are maintained at a temperature within a few degrees of freezing. Doing so retards the ability of microorganisms and other adverse agents to grow on or in the food product. This is particularly true of raw food products which have not been subjected yet to any processing step, such as meat carcasses (i.e. beef, poultry, and fish) and portions of whole carcasses, as well as fruits and vegetables which have not yet been processed. The fact that the food product has not yet been processed means that there has as yet been no intervening step such as cooking by which microorganisms or other deleterious agents may have been inactivated on or in the product. Thus, treating raw food product is benefited all the more by chilling the food product so as to prevent agents that may already be present from proliferating and thus becoming more able to deleteriously affect the product.

In some processes for processing food, particularly for processing meat, the product may be at ambient temperature or higher (such as in the case of freshly slaughtered meat, or in cases where the meat has been subjected to a processing step involving the application of heat). In these instances as well, it is desirable to chill the meat product to within a few degrees of freezing, and to do so quickly, to achieve the aforementioned objectives of retarding or inactivating deleterious agents.

Meat processors have certain target temperatures for their products that they must obtain in order to meet HACCP requirements. These requirements usually mean that the meat needs to be cooled from between 40° F. and 50° F. to a final target temperature of 32° F. to 36° F. for storage or shipping. Further processing plants that receive the raw meat products can demand even tighter temperature controls than those required by HACCP.

Current cooling methods employ manual or semi automatic dispensing of $CO_2$ dry ice nuggets, wet ice or $CO_2$ snow into boxes or carts (known as "totes") which carry on the order of 2000 pounds of meat at a time. Discretionary cooling of products in this manner can result in widely varying product temperatures with hot spots and/or frozen spots, ultimately resulting in rejected product or excessive cooling costs. In addition, determination of actual product weights may be difficult because of the carryover of wet or dry ice.

In addition to the concerns around achieving the even product temperatures mentioned above, processing plants need to be concerned about the labor involved in the material handling aspects of the current batch process and about the proper exhausting of the sublimated $CO_2$ in the processing room and refrigerated storage areas.

Thus, it is desirable in this industry to provide efficient and rapid processes for cooling food products such as meat carcasses. While some techniques have been disclosed in the prior art, they have yet to achieve an optimum combination of a rapid rate of temperature reduction, a relatively efficient consumption of cryogen used to achieve the temperature reduction, and a rapid rate of throughput in the production of chilled food product. The invention described herein achieves these objectives and others which will be disclosed in the description.

BRIEF SUMMARY OF THE INVENTION

One aspect of the present invention is apparatus for chilling a plurality of pieces of a food product, comprising
(A) cooling means comprising (1) a rotatable drum defining an enclosure and having an inlet for said pieces and an outlet for said pieces, (2) means in said drum for continuously urging pieces in said drum from said inlet through a cooling region in said enclosure and toward and out of the outlet when the drum is rotating, (3) cryogen dispensing means for feeding cryogen from a source outside said drum into said drum and dispensing said cryogen onto said cooling region, and (4) means for rotating said drum;
(B) feeding means for receiving said plurality of pieces and feeding them continuously into the inlet of the rotatable drum, which feeding means includes means for automatically sensing the mass flow rate at which said pieces are being fed into said inlet and for generating electrical signals corresponding to said automatically sensed mass flow rate;
(C) electronic control means for receiving from said feeding means said signals corresponding to said mass flow rate and for receiving electronic inputs corresponding to the temperature of said pieces being fed into said inlet and to the desired temperature of said pieces exiting the outlet of said drum, for preventing flow of cryogen onto said cooling region until a predetermined quantity of said product has been fed into said cooling region, and for automatically controlling the rate at which cryogen is fed by said cryogen dispensing means onto said cooling region as a function of said signal and said inputs so as to dispense cryogen at a rate sufficient to lower the temperature of said pieces to be at the desired exit temperature when they exit the drum;
wherein when said pieces are fed to said feeding means said feeding means senses the mass flow rate of said pieces and generates and sends to said electronic control means electrical signals corresponding to said mass flow rate, and wherein when the average temperature of said pieces and the desired exit temperature are inputted into said electronic control means, cryogen is dispensed onto said cooling region at a rate sufficient to lower the temperature of said pieces to be at the desired exit temperature when they exit the drum only after a plurality of said pieces occupy said cooling region.

Another aspect of the present invention is a method for cooling a plurality of solid pieces of a foodstuff, comprising
(A) providing a cooling means comprising (1) a rotatable drum defining an enclosure and having an inlet for said pieces and an outlet for said pieces, (2) means in said drum for continuously urging pieces in said drum from said inlet through a cooling region in said enclosure and toward and out of the outlet when the drum is rotating, (3) cryogen dispensing means for feeding cryogen from a source outside said drum into said drum and dispensing said cryogen onto said cooling region, and (4) means for rotating said drum;
(B) providing a feeding means for receiving said plurality of pieces and feeding them continuously into the inlet of the rotatable drum, which feeding means includes means for automatically sensing the mass flow rate at which said pieces are being fed into said inlet and for generating electrical signals corresponding to said automatically sensed mass flow rate;

(C) providing electronic control means for receiving from said feeding means said signals corresponding to said mass flow rate and for receiving electronic inputs corresponding to the temperature of said pieces being fed into said inlet and to the desired temperature of said pieces exiting the outlet of said drum, for preventing flow of cryogen onto said cooling region until a predetermined quantity of said product has been fed into said cooling region, and for automatically controlling the rate at which cryogen is fed by said cryogen dispensing means onto said cooling region as a function of said signal and said inputs so as to dispense cryogen at a rate sufficient to lower the temperature of said pieces to be at the desired exit temperature when they exit the drum;

(D) feeding said pieces to said feeding means whereupon said feeding means senses the mass flow rate of said pieces and generates and sends to said electronic control means electrical signals corresponding to said mass flow rate, inputting into said electronic control means the average temperature of said pieces and the desired exit temperature, and rotating said drum, wherein cryogen is dispensed onto said cooling region only after a plurality of said pieces occupy said cooling region.

A further aspect of the present invention is apparatus for freezing a plurality of pieces of a food product, comprising (A) freezing means comprising a housing having an inlet for said food product and an outlet for said food product, means in said housing for continuously urging pieces therein from said inlet toward and out of the outlet, and means for supplying cryogen to said housing to freeze product therein by direct or indirect contact with said cryogen;

(B) feeding means for receiving said plurality of pieces and feeding them continuously into the inlet of the housing, which feeding means includes means for automatically sensing the mass flow rate at which said pieces are being fed into said inlet and for generating electrical signals corresponding to said automatically sensed mass flow rate;

(C) electronic control means for receiving from said feeding means said signals corresponding to said mass flow rate and for receiving electronic inputs corresponding to the temperature of said pieces being fed into said inlet and to the desired temperature of said pieces exiting the outlet of said drum, for automatically controlling the rate at which cryogen is fed by said cryogen dispensing means into said housing as a function of said signals and said inputs so as to supply cryogen at a rate sufficient to freeze said pieces in said housing.

Another aspect of the invention is a continuous method for freezing a plurality of solid pieces of a foodstuff, comprising (A) providing freezing means comprising a housing having an inlet for said food product and an outlet for said food product, means in said housing for continuously urging pieces therein from said inlet toward and out of the outlet, and means for supplying cryogen to said housing to freeze product therein by direct or indirect contact with said cryogen;

(B) providing feeding means for receiving said plurality of pieces and feeding them continuously into the inlet of the housing, which feeding means includes means for automatically sensing the mass flow rate at which said pieces are being fed into said inlet and for generating electrical signals corresponding to said automatically sensed mass flow rate;

(C) providing electronic control means for receiving from said feeding means said signals corresponding to said mass flow rate and for receiving electronic inputs corresponding to the temperature of said pieces being fed into said inlet and to the desired temperature of said pieces exiting the outlet of said drum, for automatically controlling the rate at which cryogen is fed by said cryogen dispensing means into said housing as a function of said signals and said inputs so as to supply cryogen at a rate sufficient to freeze said pieces in said housing; and (D) feeding said pieces to said feeding means whereupon said feeding means senses the mass flow rate of said pieces and generates and sends to said electronic control means electrical signals corresponding to said mass flow rate, and inputting into said electronic control means the temperature of said pieces and the desired exit temperature, wherein cryogen is provided to said housing sufficient to freeze said product therein.

BRIEF DESCRIPTION OF THE DRAWING

The FIGURE is a schematic view of apparatus useful in practicing the present invention.

DETAILED DESCRIPTION OF THE INVENTION

Products that can be treated in accordance with the present invention include raw or previously heated, whole and partial meat carcasses, which are preferred, including beef, chicken, turkey and other poultry, and fish, as well as vegetables, fruits and pastry products. Preferably the temperature of the incoming food product is 40° F. to 50° F.

Referring to the FIGURE, the cooling means useful in the practice of the present invention includes a rotatable drum 1 which is preferably in the form of a cylinder whose axis of rotation is horizontal or nearly horizontal. The drum is supported on support means 2, 2' which also includes a motor and drive mechanism suitable for controllably rotating the drum about its axis.

The drum 1 includes an inlet 3, which can be seen in the partial cutaway view in the FIGURE, and also includes outlet 4. The openings 3 and 4 are formed in opposing ends of the drum 1. Inlet 3 and outlet 4 are dimensioned so that the pieces of food product being fed into the drum can fit comfortably through both openings, and the overall diameter of drum 1 is large enough that a quantity of food product to be chilled can remain in the drum to be chilled without immediately spilling out of either opening. Chilled product exiting outlet 4 can be stored, shipped, or otherwise handled or treated in accordance with the wishes of the user.

As can be seen in the cutaway portion of drum 1, the interior of the drum is provided with several baffles 5 in the form of inwardly projecting plates which are each positioned at an angle with respect to the axis of rotation so that rotation of the drum will continuously urge pieces of product within the drum from the inlet 3 towards and out of the outlet 4. The baffles should be of a length in the radial direction sufficient to scoop up pieces of product as the drum rotates, and carry them no more than about two-thirds of the way from the lowermost portion of the drum up one side of the drum before the pieces tumble off of the baffles down toward the lowermost portion of the drum.

Cryogen is fed controllably (i.e. through a valve or equivalent means capable of being closed or opened to any desired extent) into the interior of the drum from cryogen source 6, which will typically be a cylinder or other source of cryogen under pressure. The preferred cryogen is carbon dioxide or liquid nitrogen. When carbon dioxide is the cryogen it is dispensed within the interior of the drum as a mixture (known as "snow") of solid and cold gaseous carbon dioxide. Cryogen is fed from source 6 through line 7 into the interior of the drum, and is dispensed out nozzle 8 at the end of line 7 into the interior of the drum.

Nozzle 8 should be positioned so that the cryogen is dispensed onto only a particular defined region within the drum, the region preferably extending from the lowermost portion up to at most a quarter to a half way toward the top of the drum (i.e., if seen from an end-on view, from about the 6 o'clock position to no more than about the 3 o'clock position when the drum is rotating counterclockwise).

Preferred nozzles useful for effectively dispensing carbon dioxide for this purpose include those disclosed in U.S. Pat. No. 5,868,003 and U.S. Pat. No. 5,765,394, the disclosures of which are hereby incorporated herein by reference. Such nozzle arrangements include an expansion member, or other member, having multiple fine channels through it, which is positioned completely across and occluding the cryogenic fluid pathway in the nozzle and provides multiple expansion channels through the member. The preferred material for the expansion member is sintered, or micro-drilled, stainless steel; however, any material which provides multiple porous channels or microchannels for passage of a cryogenic fluid into a region of lower pressure is acceptable. The expansion member must have multiple paths for expansion of the cryogenic fluid so that, in combination with a pressure gradient thereacross, the cryogenic fluid (if carbon dioxide) is converted to vapor and a fine snow particulate which exits from the expansion material at a lower velocity than would occur if the pressure drop for the same flow was created by a single hole orifice. The term "expansion material" includes as base material metals, ceramics, glasses, plastics, composites, screens, steel wool and the like.

Stainless steel sintered porous products useful as the expansion member can be obtained from the Mott Metallurgical Corporation, Farmington Industrial Park, 84 Spring Lane, Farmington, Connecticut. The porous inserts can be fabricated into various thicknesses and diameters and may be specified, as to porosity, e.g. from 0.2 to 100 microns, in various gradations, and preferably from about 5 to about 20 microns. The shape and pore size of the porous insert may vary in accordance with the application and structure of the nozzle. For example, a 5 micron porosity insert will create less snow per unit of area than a 10 micron porosity insert of equal surface area. For a more circular pattern of cryogen, a disk may be used. For a more fan-shaped pattern, then a disk or cap with a fan-shaped porous region may be provided at the outlet of the nozzle.

Micro-drilled expansion members (inserts) are also useful. "Micro-drilled" as used herein is meant to refer to expansion members having multiple fine channels that are mechanically formed by drilling, piercing or the like. It is contemplated that such microdrilled expansion members may have holes of up to about 300 microns in diameter, and preferably in the range of about 10 microns to about 200 microns.

The apparatus useful in this aspect of the present invention also includes means 11 for feeding product into the drum. Feeding means 11 preferably includes a conveyor belt 12 on its top surface, which performs the function of conveying pieces of product toward chute 13, which feeds the product into inlet 3. Simultaneously, feeding means 11 determines the weight of material being conveyed on belt 12, so that in combination with the belt speed (which is generally constant) the mass flow rate of material on conveyor 12 (i.e., the rate at which material is flowing expressed as mass per unit of time) can be determined. The feeding means generates an electrical signal which corresponds to the particular mass flow rate determined by the feeding means, or two electrical signals corresponding respectively to the weight of the material and the belt speed. The mass flow rate and the electrical signal or signals corresponding thereto are generated effectively continuously, as the mass flow rate is measured and accumulated into a register continuously.

Devices suitable for carrying out these functions are commercially available. Examples include devices available from the Milltronics Company, Mass Dynamics Division, including those known as the "Auto Weigh Feeder Series 600" and those available from Scanzaegt, Aarhus, Norway, known as "ScanFlow 4674".

The electrical signal or signals generated by the feeding means 11 is conveyed to electronic controller 14, which can be a distinct unit as shown in the FIGURE or can be incorporated into other apparatus described herein. Controller 14 is preferably a small computer or other equivalent device. It must be capable of receiving the signal generated by feeding means 11, and also capable of receiving as electrical signals input corresponding to the average temperature of the pieces of food product being fed into drum 1 (via manual input using a keyboard, or via an electrical signal generated by a temperature sensing means, preferably an infrared heat sensing eye, for sensing the temperature of the incoming food product on conveyor 12), as well as the desired temperature of the food product as it exits outlet 4. Infrared sensors useful for this purpose, which detect heat and quantify it as an electrical signal proportional to the sensed temperature, are commercially available.

Controller 14 is programmed, in any conventionally known manner, to generate from these inputs and the signal from feeding means 11, an output signal corresponding to the flow rate at which cryogen is to be supplied to line 7 and to the interior of drum 1 so as to bring about the desired degree of temperature reduction of the food products passing through drum 1. Control of cryogen flow is exercised by electrical control of a valve (not shown) in line 7 which adjusts the pressure in the feed line to correspond to the desired rate of flow of cryogen through line 7. The output signal is of course also a function of the temperature differential of the incoming and outgoing product, of the mass flow rate of the product passing into and through the drum, as well as a function of the temperature and the specific heat of vaporization of the cryogen applied via nozzle 8. These relationships are programmed into controller 14.

In general, the desired exit temperature of food product exiting outlet 4 is preferably about 32° F. to about 36° F. The average temperature of the incoming product can vary widely. It can be measured manually and manually inputted to controller 14 or it can be measured automatically (e.g. electronically, such as by an infrared sensing eye as described above) which sends a corresponding signal to controller 14.

The temperature inside the drum is generally as low as −100° F. to −110° F. This temperature is preferably sensed by an infrared sensor (which as described above generates an electrical signal corresponding to the sensed temperature) that measures the temperature of the exterior surface of the drum. This temperature closely correlates to, and usually is the same as, the temperature of the interior of the drum.

In another aspect of this invention, it has been determined that operation in a manner which applies cryogen directly to the interior surface of the drum is very undesirable. Such a practice wastes cryogen that should beneficially be applied to the food product itself Also, such a practice leads to excessive chilling of the interior surface of the drum, which causes the food product which is fed into the drum to stick to the excessively chilled areas, resulting in reduced rates of throughput and damage or tearing of the food product which eventually requires the operator to shut down the operation for removal of food products stuck to the interior surface and for cleaning of the interior surface.

To achieve this result, several conditions are indicated. One is that the nozzle 8 is positioned so that it dispenses cryogen only onto the cooling region of the drum interior which is occupied by pieces of food product being cooled. The cooling region should preferably be the quarter-circular area of the drum interior from the lowermost point of the drum interior up the side of the drum in the direction of rotation. That is, thinking again of the drum viewed end-on, the pattern in which the cryogen is dispensed should be no more than the quarter-circle region between the 6 o'clock position and the 3 o'clock position if the drum is being rotated counterclockwise.

In addition, the operation of the apparatus overall should include provisions so that when operation is first initiated with a new incoming stream of food products, the controller 14 is programmed so that cryogen flow is not initiated until enough time has elapsed so that pieces of food product have been fed into the drum and begun to occupy the cooling region to which cryogen will thereafter be applied. The length of this delay period can easily be calculated, or determined from experience, and programmed into the controller 14. Of course, higher flow rates as detected and signaled by the feeding means 11 will correspond to shorter delays before the onset of cryogen flow into line 7, and vice versa.

In addition, in an optional but preferred embodiment of this invention, the controller is also programmed so that when the feeding means detects no food product being fed (i.e., a mass flow rate of 0) for a long enough period of time that the cooling region within the drum may be emptied of pieces of food product as the drum continues to rotate, then the controller means 14 will shut off the flow of cryogen in order to prevent the aforementioned undesired application of cryogen directly to the interior surface of the drum without impinging on pieces of food product.

The present invention provides numerous advantages including those described hereinabove. Product is conveyed into the rotating drum where it is gently tumbled while $CO_2$ snow or other cryogen is evenly dispensed using the injection technology described herein. With the constant turnover of the product mixing with the injected $CO_2$ snow, cooling is rapid and very uniform. Residence times in the unit are on the order of two to six minutes, depending on the product's size and inlet temperatures. $CO_2$ vapor is exhausted at the ends of the drum, controlling the processing room environment, and since no snow is carried over into receptacles that receive product exiting the drum, tare weight and exhaust concerns in the refrigerated cold storage room are also eliminated.

The invention is able to handle significant surges in production, and can act as a product accumulation point during starts and stops in production.

It has also been found that cryogen consumption is reduced by 5% to 20% compared to other chilling systems.

The invention also provides precise control of cryogen injection, helps to eliminate excess cryogen discharge, helps to eliminate product overfreezing, and minimizes product rework due to underchilling. Also, the several electrical signal inputs that are utilized can be used to measure productivity and cryogen usage.

The invention is also readily adaptable to freezing applications. The feeding means is positioned to feed product into the inlet of a freezing means, which can be a drum as described herein or can be any other apparatus capable of receiving product in an inlet, freezing the product, and discharging frozen product out an outlet. In the same manner as described hereinabove the feeding means determines the rate at which product is being fed into the inlet and generates signals corresponding to the rate, and an electronic control means receives those signals and receives inputs corresponding to the temperature of product being fed into the inlet and to the desired temperature of product exiting the outlet, and input corresponding to the desired residence time in the drum sufficient to freeze the product. Then, cryogen is supplied to the freezer housing at a rate sufficient to freeze the pieces of product while they are passing through the freezer housing. Freezing can be carried out directly, i.e. by applying cryogen directly onto the pieces, or indirectly, i.e. by supplying cryogen to a heat transfer surface such as plates, pipes, or equivalent means, such that heat is withdrawn from the product through the heat transfer surface.

What is claimed is:

1. Apparatus for chilling or freezing a plurality of pieces of a food product, comprising
   (A) cooling means comprising (1) a rotatable drum defining an enclosure and having an inlet for said pieces and an outlet for said pieces, (2) means in said drum for continuously urging pieces in said drum from said inlet through a cooling region in said enclosure and toward and out of the outlet when the drum is rotating, (3) cryogen dispensing means for feeding cryogen from a source outside said drum into said drum and dispensing said cryogen onto said cooling region, and (4) means for rotating said drum;
   (B) feeding means for receiving said plurality of pieces and feeding them continuously into the inlet of the rotatable drum, which feeding means includes means for automatically sensing the mass flow rate at which said pieces are being fed into said inlet and for generating electrical signals corresponding to said automatically sensed mass flow rate;
   (C) electronic control means for receiving from said feeding means said signals corresponding to said mass flow rate and for receiving electronic inputs corresponding to the temperature of said pieces being fed into said inlet and to the desired temperature of said pieces exiting the outlet of said drum, predetermined quantity of said product has been fed into said cooling region, and for automatically controlling the rate at which cryogen is fed by said cryogen dispensing means onto said cooling region as a function of said signals and said inputs so as to dispense cryogen at a rate sufficient to lower the temperature of said pieces to be at the desired exit temperature when they exit the drum;

wherein when said pieces are fed to said feeding means said feeding means senses the mass flow rate of said pieces and generates and sends to said electronic control means electrical signals corresponding to said mass flow rate, and wherein when the average temperature of said pieces and the desired exit temperature are inputted into said electronic control means, cryogen is dispensed onto said cooling region at a rate sufficient to lower the temperature of said pieces to be at the desired exit temperature when they exit the drum only after a plurality of said pieces occupy said cooling region.

2. Apparatus according to claim 1 wherein said cryogen dispensing means includes a line which feeds cryogen into said drum and includes a member having multiple fine channels therein which is positioned completely across the end of said line inside said drum.

3. Apparatus according to claim 1 wherein said cryogen is carbon dioxide.

4. Apparatus according to claim 1 wherein said feeding means contains infrared temperature sensing means for sensing the temperature of said food pieces and generating an electrical signal corresponding to said sensed temperature, and said signal is said electrical input corresponding to the temperature of said pieces.

5. Apparatus according to claim 1 wherein said cooling region consists of a quarter-circular area from the lowermost point of the drum interior up the side of the drum in the direction of rotation.

6. Apparatus according to claim 1 wherein said cooling means includes infrared temperature sensing means for sensing the temperature of the exterior surface of said drum and generating an electrical signal corresponding to said sensed temperature, and said control means receives said signal and controls flow of cryogen to said cooling means in response to said signal.

7. A continuous method for cooling a plurality of solid pieces of a foodstuff, comprising
  (A) providing a cooling means comprising (1) a rotatable drum defining an enclosure and having an inlet for said pieces and an outlet for said pieces, (2) means in said drum for continuously urging pieces in said drum from said inlet through a cooling region in said enclosure and toward and out of the outlet when the drum is rotating, (3) cryogen dispensing means for feeding cryogen from a source outside said drum into said drum and dispensing said cryogen onto said cooling region, and (4) means for rotating said drum;
  (B) providing a feeding means for receiving said plurality of pieces and feeding them continuously into the inlet of the rotatable drum, which feeding means includes means for automatically sensing the mass flow rate at which said pieces are being fed into said inlet and for generating electrical signals corresponding to said automatically sensed mass flow rate;
  (C) providing electronic control means for receiving from said feeding means said signals corresponding to said mass flow rate and for receiving electronic inputs corresponding to the temperature of said pieces being fed into said inlet and to the desired temperature of said pieces exiting the outlet of said drum, for preventing flow of cryogen onto said cooling region until a predetermined quantity of said product has been fed into said cooling region, and for automatically controlling the rate at which cryogen is fed by said cryogen dispensing means onto said cooling region as a function of said signal and said inputs so as to dispense cryogen at a rate sufficient to lower the temperature of said pieces to be at the desired exit temperature when they exit the drum;
  (D) feeding said pieces to said feeding means whereupon said feeding means senses the mass flow rate of said pieces and generates and sends to said electronic control means electrical signals corresponding to said mass flow rate, inputting into said electronic control means the temperature of said pieces and the desired exit temperature, and rotating said drum, wherein cryogen is dispensed onto said cooling region only after a plurality of said pieces occupy said cooling region.

8. A method according to claim 7 wherein the temperature of said food products entering said inlet is 40° F. to 50° F.

9. A method according to claim 7 wherein the temperature of said food products exiting said outlet is 32° to 36° F.

10. A method according to claim 7 wherein said cryogen dispensing means includes a line which feeds cryogen into said drum and includes a member having multiple fine channels therein which is positioned completely across the end of said line inside said drum.

11. A method according to claim 7 wherein said cryogen is carbon dioxide.

12. A method according to claim 7 wherein said feeding means contains infrared temperature sensing means for sensing the temperature of said food pieces and generating an electrical signal corresponding to said sensed temperature, and said signal is said electrical input corresponding to the temperature of said pieces.

13. A method according to claim 7 wherein said cooling region consists of a quarter-circular area from the lowermost point of the drum interior up the side of the drum in the direction of rotation.

14. A method according to claim 7 wherein said cooling means includes infrared temperature sensing means for sensing the temperature of the exterior surface of said drum and generating an electrical signal corresponding to said sensed temperature, and said control means receives said signal and controls flow of cryogen to said cooling means in response to said signal.

15. Apparatus for freezing a plurality of pieces of a food product, comprising
  (A) freezing means comprising a housing having an inlet for said food product and an outlet for said food product, means in said housing for continuously urging pieces therein from said inlet toward and out of the outlet, and means for supplying cryogen to said housing to freeze product therein by direct or indirect contact with said cryogen;
  (B) feeding means for receiving said plurality of pieces and feeding them continuously into the inlet of the housing, which feeding means includes means for automatically sensing the mass flow rate at which said pieces are being fed into said inlet and for generating electrical signals corresponding to said automatically sensed mass flow rate;
  (C) electronic control means for receiving from said feeding means said signals corresponding to said mass flow rate and for receiving electronic inputs corresponding to the temperature of said pieces being fed into said inlet and to the desired temperature of said pieces exiting the outlet of said drum, for automatically controlling the rate at which cryogen is fed by said cryogen dispensing means into said housing as a function of said signals and said inputs so as to supply cryogen at a rate sufficient to freeze said pieces in said housing.

16. A continuous method for freezing a plurality of solid pieces of a foodstuff, comprising (A) providing freezing means comprising a housing having an inlet for said food product and an outlet for said food product, means in said housing for continuously urging pieces therein from said inlet toward and out of the outlet, and means for supplying cryogen to said housing to freeze product therein by direct or indirect contact with said cryogen;

(B) providing feeding means for receiving said plurality of pieces and feeding them continuously into the inlet of the housing, which feeding means includes means for automatically sensing the mass flow rate at which said pieces are being fed into said inlet and for generating electrical signals corresponding to said automatically sensed mass flow rate;

(C) providing electronic control means for receiving from said feeding means said signals corresponding to said mass flow rate and for receiving electronic inputs corresponding to the temperature of said pieces being fed into said inlet and to the desired temperature of said pieces exiting the outlet of said drum, for automatically controlling the rate at which cryogen is fed by said cryogen dispensing means into said housing as a function of said signals and said inputs so as to supply cryogen at a rate sufficient to freeze said pieces in said housing; and (D) feeding said pieces to said feeding means whereupon said feeding means senses the mass flow rate of said pieces and generates and sends to said electronic control means electrical signals corresponding to said mass flow rate, and inputting into said electronic control means the temperature of said pieces and the desired exit temperature, wherein cryogen is provided to said housing sufficient to freeze said product therein.

* * * * *